(12) United States Patent
Chao

(10) Patent No.: US 6,330,567 B1
(45) Date of Patent: Dec. 11, 2001

(54) SEARCHING SYSTEM FOR SEARCHING FILES STORED IN A HARD DISK OF A PERSONAL COMPUTER

(75) Inventor: Kuo-Jen Chao, Tainan Hsien (TW)

(73) Assignee: Tornado Technologies Co., LTD, Taipei (TW)

( * ) Notice: Subject to any disclaimer, the term of this patent is extended or adjusted under 35 U.S.C. 154(b) by 0 days.

(21) Appl. No.: 09/133,675

(22) Filed: Aug. 13, 1998

(51) Int. Cl.$^7$ ................................................ G06F 17/30
(52) U.S. Cl. .............................. 707/200; 707/3
(58) Field of Search ........................ 707/3, 4, 7, 10, 707/200, 201, 202, 203, 204, 205, 206; 710/58, 242; 711/100, 113, 118, 170, 202, 203; 709/213, 214, 219; 713/200; 714/4

(56) References Cited

U.S. PATENT DOCUMENTS

| | | | |
|---|---|---|---|
| 5,226,176 | * 7/1993 | Westaway et al. | 707/2 |
| 5,787,461 | * 7/1998 | Stephens | 711/113 |
| 5,819,261 | * 10/1998 | Takahashi et al. | 707/3 |
| 5,890,169 | * 3/1999 | Wong et al. | 707/206 |
| 5,909,540 | * 6/1999 | Carter et al. | 714/4 |
| 5,948,062 | * 9/1999 | Tzelnic et al. | 709/219 |
| 6,026,474 | * 2/2000 | Carter et al. | 711/202 |

FOREIGN PATENT DOCUMENTS

09810961 * 8/1998 (DE) ................................ G06F/17/30

OTHER PUBLICATIONS

"How to Use Microsoft Windows NT4 Workstation" by Jacquelyn Gavron et al., pp. 36–43, Jan. 1996.*
"Mastering Windows 3.1 Special Edition" by Sybex, pp. xiii–xiv and pp. 101–145, Jan. 1993.*

* cited by examiner

Primary Examiner—Diane Mizrahi
(74) Attorney, Agent, or Firm—Winston Hsu

(57) ABSTRACT

A searching system which can quickly search the filenames and file paths of certain desired files stored in a hard disk of a personal computer. The personal computer comprises a memory for storing programs and data and a processor for executing the programs stored in the memory. The searching system comprises a filename file stored in the memory for recording filenames of all the files and directories stored in the hard disk, an index file stored in the memory for recording file paths of the files and directories stored in the filename file, and a search program stored in the memory for searching the filenames stored in the filename file according to certain user specified search parameters to generate an output and then generating the file paths of the files contained in the output by using the index file. The filename and index files are maintained in the memory of the personal computer so that searching speeds for searching files stored in the hard disk can be substantially reduced.

5 Claims, 4 Drawing Sheets

SEARCHING SYSTEM FOR SEARCHING FILES STORED IN A HARD DISK OF A PERSONAL COMPUTER

BACKGROUND OF THE INVENTION

1. Field of the Invention

The present invention provides a searching system, and more particularly, a searching system for searching desired files and their file paths on a hard disk of a personal computer.

2. Description of the Prior Art

Files in a computer's hard disk are arranged in a hierarchical tree structure to form a directory system. Access to files is often managed through use of a FAT (file allocation table). This directory system consists of a root directory at the topmost point of the tree structure which may also serve as the label of the hard disk. A plurality of subdirectories are located subordinate to the root directory within which are the computer files. Each file and directory connects to its parent directory and adjacent subdirectories in the FAT through a specific path pointer.

To locate a particular file, the computer system sequentially searches each path in the tree-like structure of the directory system of the hard disk. The general search program can also find adjacent subdirectories and the path pointer of parent directories in the FAT. In this way, desired files are found with all associated parent hierarchical directories.

The efficiency of computer systems is impaired by performance of time-consuming mechanical procedures involving reading data from or writing data to a hard disk and sequential data searches. Due to the present complexity and increased storage capacity of hard disks, users may become overwhelmed by the large numbers of files and not be informed about detailed path information or directory names. In a prior art searching operation, even for a very small file, the user would have to perform a time-consuming mechanical search operation on the large hard disk that would waste time and cause potential damage to the magnetic head of the hard disk.

SUMMARY OF THE INVENTION

It is therefore a primary objective of the present invention to provide a searching system to rapidly locate files or their file paths on a hard disk of a personal computer system to solve the above mentioned problem.

In a preferred embodiment, the present invention provides a searching system for searching filenames and file paths of files stored in a personal computer's hard disk. The searching system comprises:

a filename file for recording filenames of files in the hard disk;

an index file for recording file paths of the files recorded in the filename file; and a search program for searching the filenames recorded in the filename file according to at least one search parameter provided by a user to generate a filename output, and searching the file paths for the filenames contained in the output by using the index file to generate an index output.

It is an advantage of the present invention that the searching system utilizes a prestored filename file and index file for quickly finding the corresponding information of the filenames in these two files instead of on a larger hard disk drive.

This and other objectives and the advantages of the present invention will no doubt become obvious to those of ordinary skill in the art after having read the following detailed description of the preferred embodiment which is illustrated in the various figures and drawings.

DETAILED DESCRIPTION OF THE PREFERRED EMBODIMENT

Figure 1:
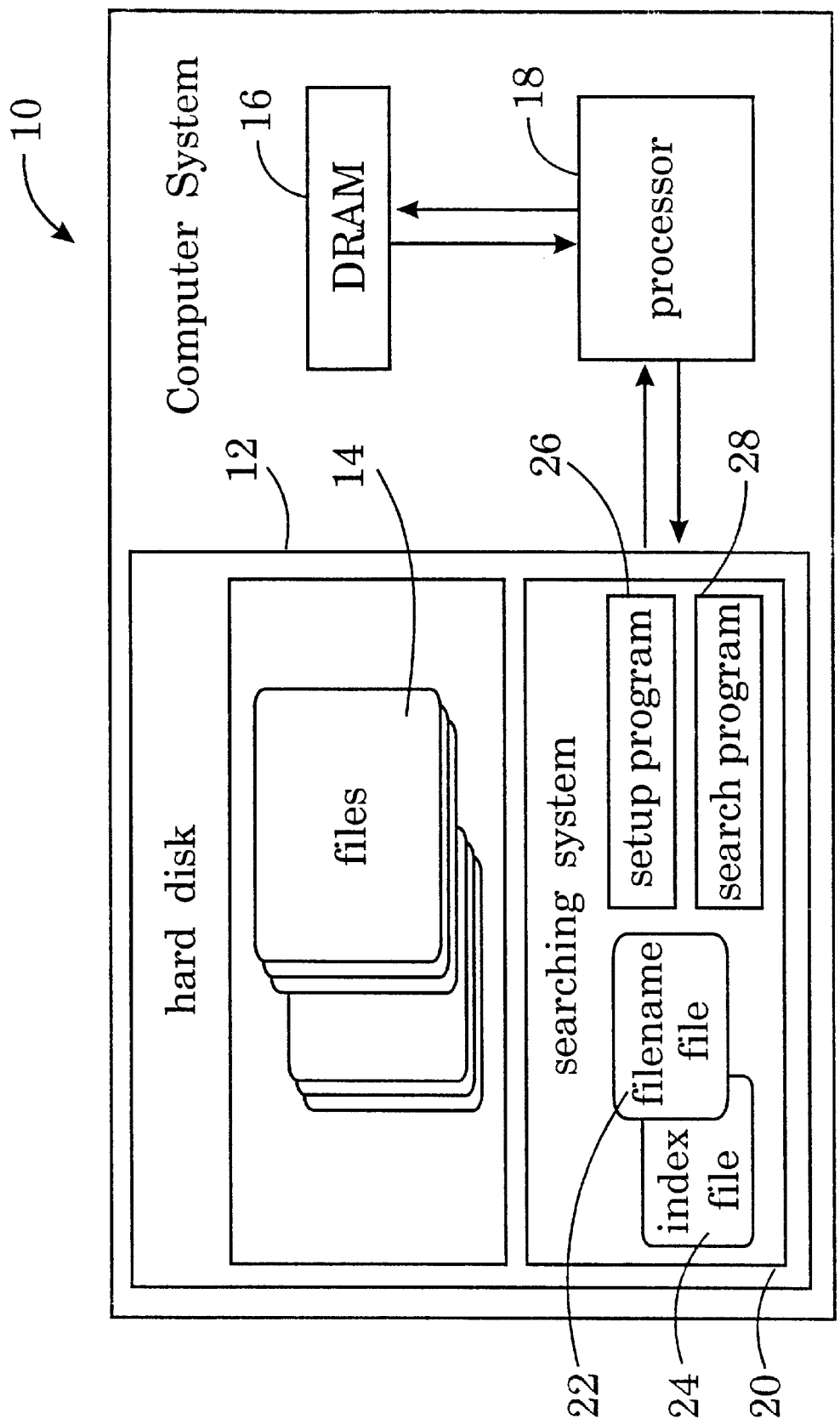
FIG. 1 is a function block diagram of the searching system according to the present invention.

Please refer to FIG. 1. FIG. 1 is a function block diagram of a searching system 20 according to the present invention. The searching system 20 can quickly find the filenames and file paths of all files within a hard disk 12 of a computer system 10. The computer system 10 comprises a DRAM (dynamic random access memory) 16 for storing programs and data, and a processor 18 for executing the stored programs within the DRAM 16. The searching system 20 further comprises a filename file 22 for recording filenames of all files 14 in the hard disk 12, an index file 24 for recording the file paths of these files within the filename file 22, a setup program 26 for creating or updating the filename file 22 and index file 24, and a search program 28 for searching files or directories within the filename file 22 and index file 24 for all filenames and file paths corresponding to the searching parameter specified by a user.

Figure 2:
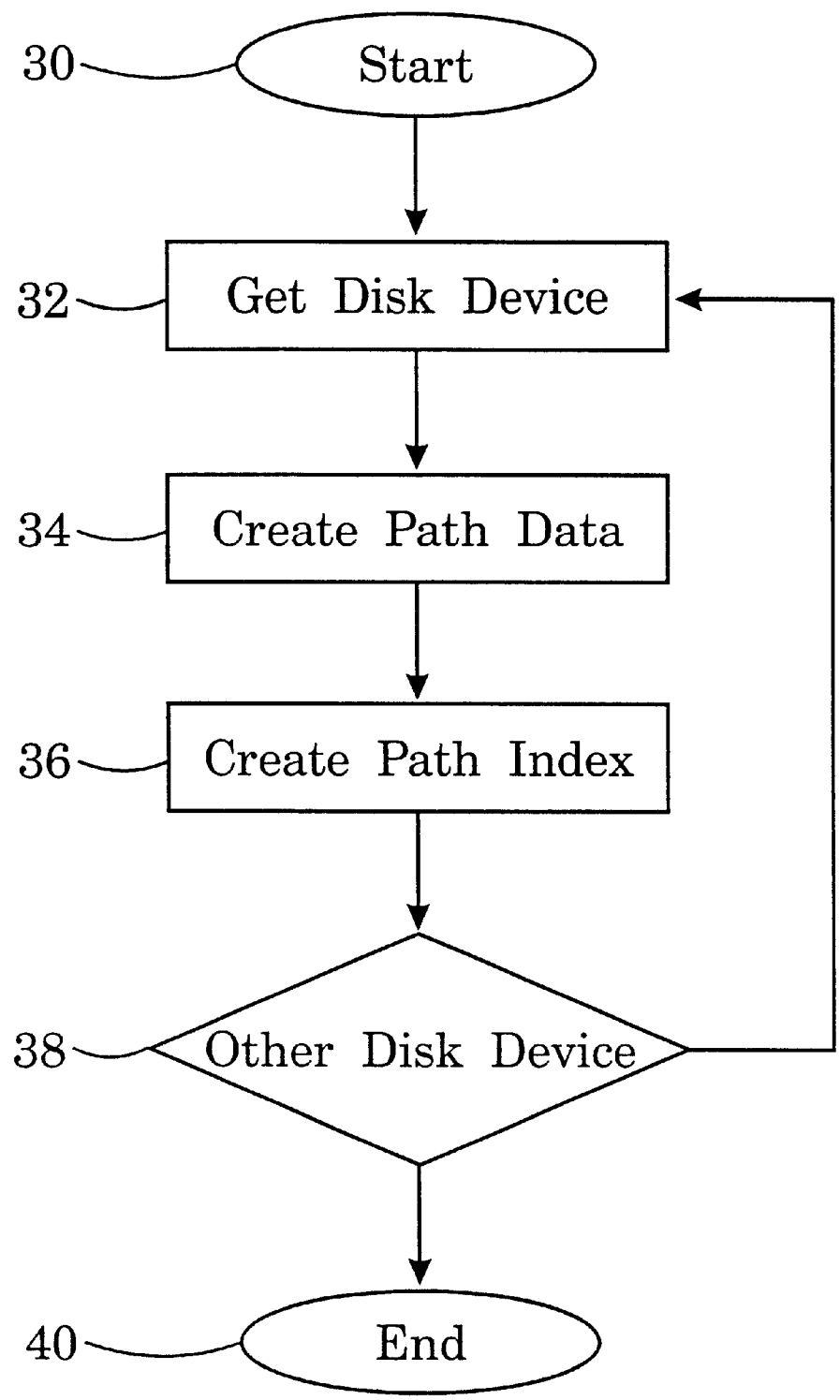
FIG. 2 is a flowchart for creating an index of filenames by the searching system of the present invention.

Please refer to FIG. 2. FIG. 2 is a flowchart for creating an index of filenames by the setup program 26 of the searching system 20. It comprises the following steps:

Step 30: starting to create an index of filenames;

Step 32: locating the hard disk 12 without an index using the setup program 26;

Step 34: creating the filename file 22 according to all of the directories and subordinate filenames in the hard disk 12 using the setup program 26;

Step 36: creating the index file 24 of the directories and filenames based on the filename file 22 using the setup program 26;

Step 38: verifying the presence of hard disks not yet indexed; if present, go to step 32;

Step 40: end.

In the Step 34 and 36, filenames and directory names within the filename file 22 are sequentially arranged in a specific order and the file paths of the correspondent files 14 in the filename file are arranged in the same sequence within the index file 24. The filename file 22 comprises all the file information within the hard disk 12, including a plurality of directories arranged in a hierarchical tree structure, and files stored in the directories. In the above mentioned process, the setup program 26 can create the respective filename file 22 and index file 24 for each hard disk 12 which is electrically connected with the computer system 10.

Figure 3:
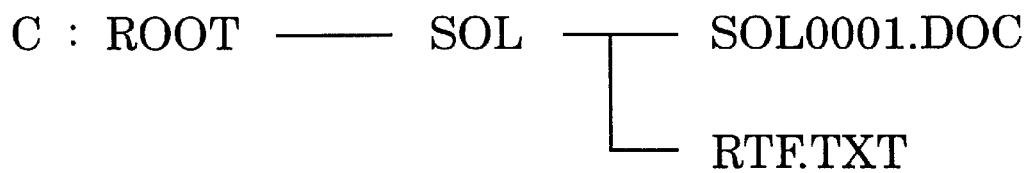
FIG. 3 shows a sketching diagram for a string of files and directories in a hard disk.
Figure 4:
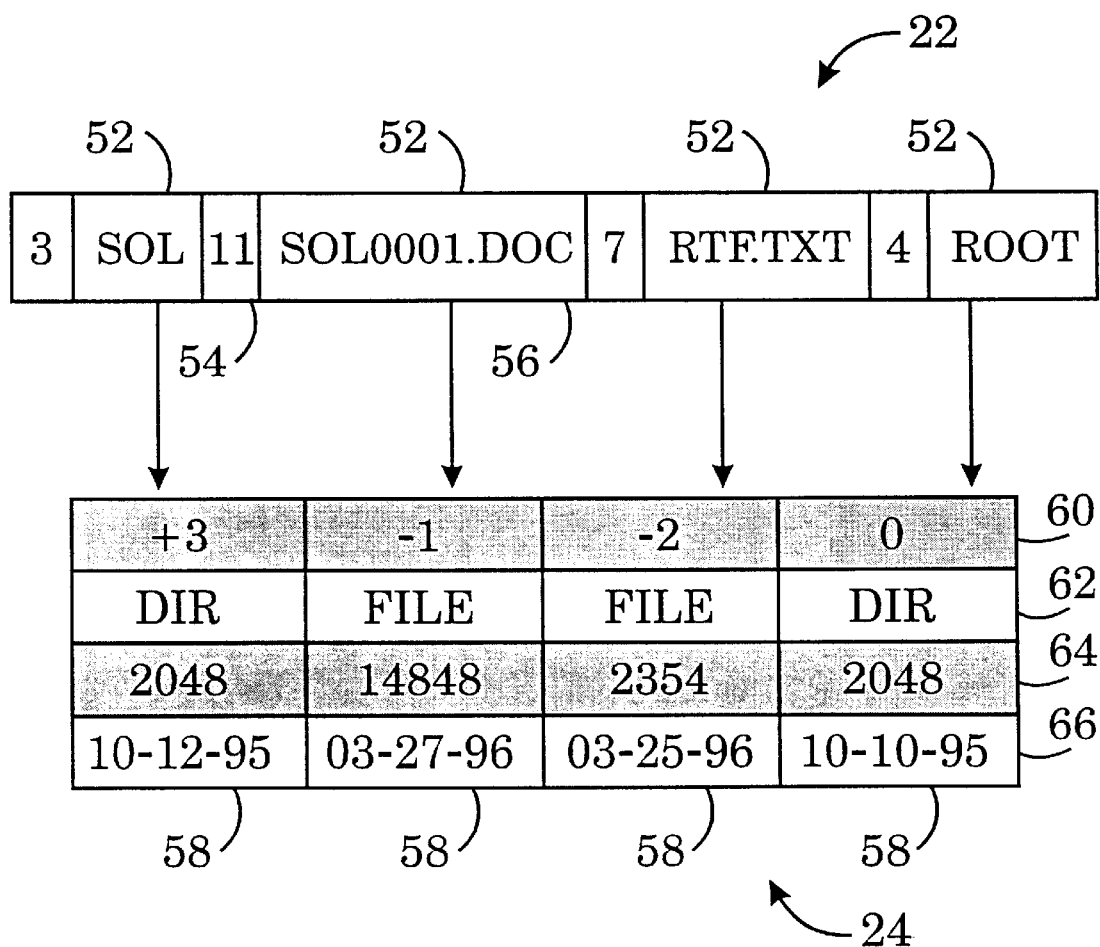
FIG. 4 shows a format of a filename file and its corresponding index file for a file and directory shown in FIG. 3.

Please refer to FIG. 3 and FIG. 4. FIG. 3 shows a sketching diagram for a series of files and directories in a hard disk "C:". The hard disk "C:" comprises many directories and files sorted in a hierarchical tree structure, wherein the "ROOT" represents a root directory, the "SOL" is for a subdirectory below the root directory, and the "SOL0001.DOC" and "RTF.TXT" represent two different files stored in the "SOL" subdirectory. FIG. 4 shows a format of the filename file 22 and the index file 24 created by the setup program 26 according to the file and directory stored in the disk device "C:".

In the filename file 22, each directory or file further comprises a filename entry 52 having a word count 54 for the filename and filename item 56. Each filename entry 52 has a corresponding index entry 58 within the index file 24 for recording index data for each file, such as the parent directory pointer 60, file type 62, allocated size 64, last modified or accessed date 66. The parent directory pointer 60 represents the position of the file path of a parent directory in the index entry 58 of the index file 24 over which the filename of the directory is stored in the parent directory. For example, the parent directory of the file "SOL0001.DOC" is directory "SOL", so the parent directory pointer 60 of the file "SOL0001.DOC" is −1; and the parent directory of the directory "SOL" is directory "ROOT", so its parent directory pointer 60 is +3. The root directory "ROOT" is at the top of the hierarchy of directories and therefore does not have a parent directory. Its parent directory pointer 60 is thus zero.

After the setup program 26 locates a file, it can use the parent directory pointer 60 within the index entry 58 of the finding file to organize the original file paths of the found file. For example, the path "ROOT\SOL\" of the file "SOL0001.DOC" in the hard disk "C:" can use the filename file 22 and index file 24 to sequentially build the original file paths. It is an advantage of this formatting procedure that only the parent directory pointer 60 of each file rather than the entire file path of the file is recorded at the corresponding index entry 58 thus saving storage space and search time.

Figure 5:
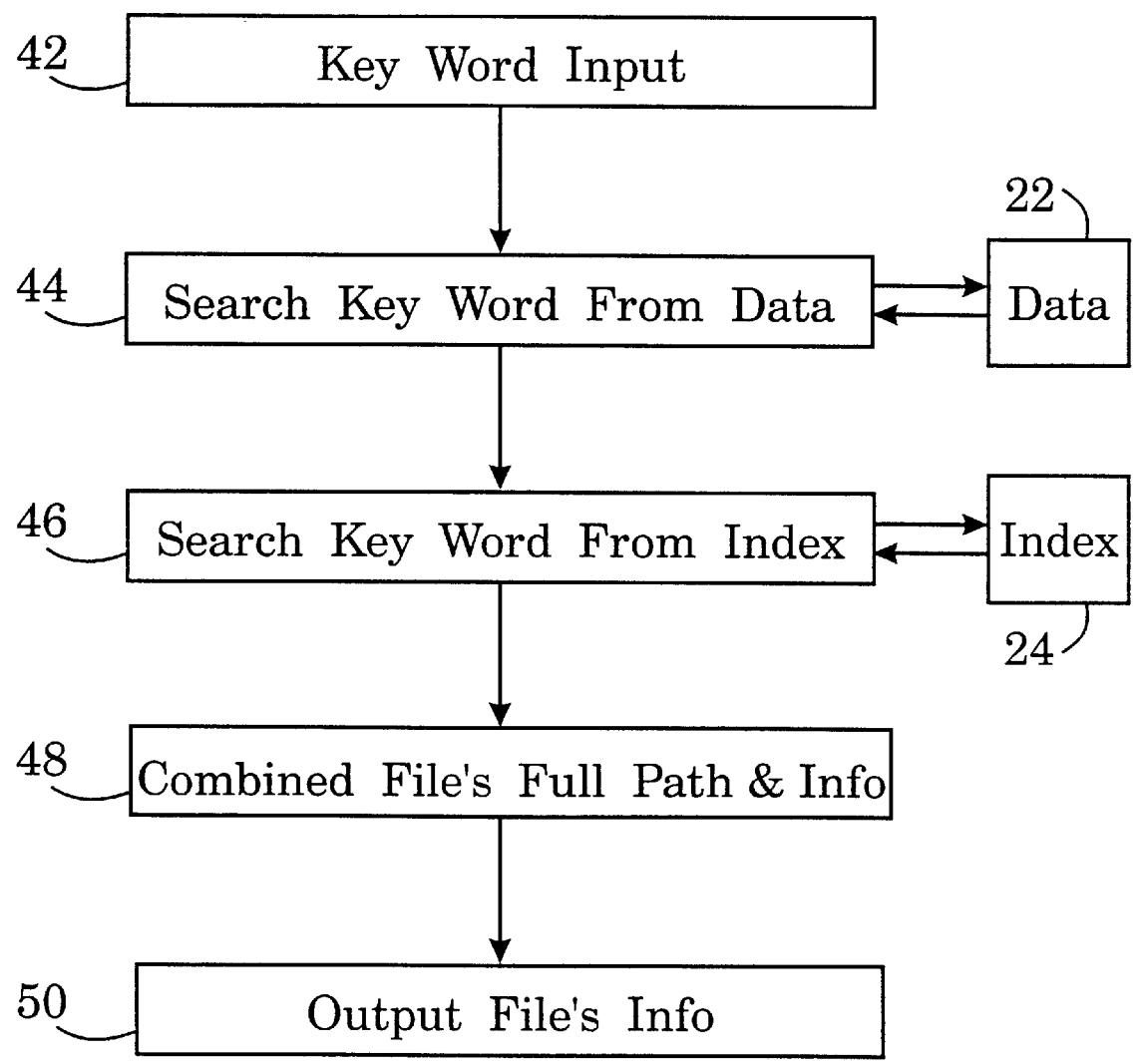
FIG. 5 is a flowchart for searching filenames by the searching system of the present invention.

Please refer to FIG. 5. FIG. 5 is a flowchart for searching filenames by the search program 28 of the searching system, and includes the following steps:

Step 42: keying in a desired filename by a user;

Step 44: searching for the corresponding filename in the filename file 22 using the search program 28;

Step 46: searching for the corresponding file paths in the index file 24 using the search program 28 based on the corresponding searched filenames within the filename file 22;

Step 48: arranging the searched filenames and file paths into file information using the searching system 20;

Step 50: displaying the file information to the user.

In Step 42, the user can key in either a full filename or a portion of a filename of the file 14, a text string or wildcard characters (for example *.txt) to search for the desired file on a specified hard disk and all associated subdirectories. The filename file 22 and index file 24 are temporarily stored in the DRAM 16 when the personal computer is in operation. The speed of the file search is much improved in the present invention as the search program 28 can simply search the DRAM 16, instead of requiring more time to access the hard disk 12, for the desired filename and file paths.

Those skilled in the art will readily observe that numerous modifications and alterations of the propeller may be made while retaining the teachings of the invention. Accordingly, the above disclosure should be construed as limited only by the metes and bounds of the appended claims.

What is claimed is:

1. A searching system for searching filenames and file paths of files stored in a personal computer's hard disk, the hard disk comprising a directory system having a plurality of directories arranged in a hierarchical tree structure, the filenames of all the files stored in the hard disk stored in the directories of the directory system, the personal computer comprising a dynamic random access memory for storing programs and data and a processor for executing the programs stored in the memory, the searching system comprising:

a filename file stored in the memory for recording filenames of all the files and directories in the hard disk, the filenames sequentially arranged in a specific order within the filename file;

an index file stored in the memory for recording file paths within the directory system of the all the files and directories recorded in the filename file, corresponding file paths of the filenames in the filename file being arranged in the same sequence within the index file, the file path of each file stored in the index file comprising a pointer for indicating the position of the file path of a local directory in the index file over which the filename of the file is stored in the local directory, the file path of each directory stored in the index file comprising a pointer for indicating the position of the file path of a parent directory in the index file over which the filename of the directory is stored in the parent directory; and a search program for searching the filenames recorded in the filename file according to at least one search parameter provided by a user to generate a filename output, and searching the file paths for the filenames contained in the output by using the index file to generate an index output.

2. The searching system of claim 1 wherein the directory system contains a root directory located at the top of its hierarchical tree structure and the file path of the root directory contains a specific pointer for indicating that it is a root directory.

3. The searching system of claim 2 wherein when searching the file path of a specific file, the search program will use the pointer contained in the correspondent file path of the file in the index file to obtain the file paths of all the parent directories of the file in the index file and organize a complete file path of the file within the directory system.

4. The searching system of claim 1 wherein the index file further records file type, last modified date and size along with the file path of each file recorded in the filename file.

5. The searching system of claim 1 further comprising a setup program for creating and updating the filename file and the index file.

* * * * *